US011701918B1

(12) United States Patent
Edin

(10) Patent No.: US 11,701,918 B1
(45) Date of Patent: Jul. 18, 2023

(54) BICYCLE RIM ADAPTED TO REDUCE SPOKE FATIGUE

(71) Applicant: Hed Cycling Products, Inc., Roseville, MN (US)

(72) Inventor: Christopher Andrew Edin, Mahtomedi, MN (US)

(73) Assignee: Hed Cycling Products, Inc., Roseville, MN (US)

( * ) Notice: Subject to any disclaimer, the term of this patent is extended or adjusted under 35 U.S.C. 154(b) by 235 days.

(21) Appl. No.: 16/851,867

(22) Filed: Apr. 17, 2020

Related U.S. Application Data

(60) Provisional application No. 62/835,291, filed on Apr. 17, 2019.

(51) Int. Cl.
*B60B 1/04* (2006.01)
*B60B 21/06* (2006.01)

(52) U.S. Cl.
CPC .............. *B60B 1/044* (2013.01); *B60B 1/041* (2013.01); *B60B 21/062* (2013.01)

(58) Field of Classification Search
CPC ....... B60B 21/062; B60B 1/041; B60B 1/043; B60B 1/044
See application file for complete search history.

(56) References Cited

U.S. PATENT DOCUMENTS

| | | | |
|---|---|---|---|
| 4,583,787 A | 4/1986 | Michelotti | |
| 5,228,756 A | 7/1993 | Krampera | |
| 6,216,344 B1 | 4/2001 | Mercat et al. | |
| 6,224,165 B1 | 5/2001 | Mercat et al. | |
| 6,378,953 B2 | 4/2002 | Mercat et al. | |
| 6,497,042 B1 | 12/2002 | Dietrich | |

(Continued)

FOREIGN PATENT DOCUMENTS

| | | | |
|---|---|---|---|
| CN | 201941514 | | 8/2011 |
| CN | 205395645 U | * | 7/2016 |

(Continued)

OTHER PUBLICATIONS

Araya7x, webpage and product images <https://velobase.com/ViewComponent.aspx?ID=d2d2a68c-c40d-4f99-b097-1372d478922&Enum=107>, 4 pages, retrieved from <https://velobase.com/ViewComponent.aspx?ID=d2d2a68c-c40d-4f99-b097-13721d478922&Enum=107> on Feb. 28, 2023.

(Continued)

*Primary Examiner* — Kip T Kotter
(74) *Attorney, Agent, or Firm* — Sprinkle IP Law Group

(57) ABSTRACT

A bicycle rim comprising a circumferential outer portion adapted to receive a tire and a spoke bed. The spoke bed may comprise a pattern of spoke attachment segments at varying tilt angles and spaced by intermediate segments. Each spoke attachment segment may comprise an inner surface, an outer surface and a spoke opening extending from the inner surface to the outer surface. The spoke opening may be sized to accommodate a spoke nipple. The spoke opening may have a central axis angled at a complex angle that is a combination of a respective camber angle and a respective crossing angle. The complex angle may be selected to achieve a respective spoke angle. The outer surface of the spoke attachment segment adjacent to the spoke opening may extend perpendicular to the central axis of the spoke opening.

16 Claims, 15 Drawing Sheets

(56) References Cited

U.S. PATENT DOCUMENTS

| | | |
|---|---|---|
| 6,715,844 B2 | 4/2004 | Dietrich |
| 7,083,239 B2 | 8/2006 | Okajima |
| 7,090,307 B2 | 8/2006 | Okajima |
| 7,192,098 B2 | 3/2007 | Okajima |
| 7,290,839 B2 | 11/2007 | Okajima |
| 7,427,112 B2 | 9/2008 | Schlanger |
| 8,449,044 B2 | 5/2013 | Chan |
| 8,696,069 B2 | 4/2014 | Watarai |
| 8,746,808 B2 | 6/2014 | Kuan et al. |
| 8,967,731 B2 | 3/2015 | Goto |
| 9,073,388 B2 | 7/2015 | Chen |
| 9,290,043 B2 | 3/2016 | Schlanger |
| 2005/0023883 A1 | 2/2005 | Okajima |
| 2005/0253446 A1 | 11/2005 | Okajima |
| 2008/0054711 A1 | 3/2008 | Dal Pra' et al. |
| 2010/0090519 A1 | 4/2010 | Lin |
| 2012/0324730 A1 | 12/2012 | Lin |
| 2015/0251489 A1* | 9/2015 | Lin ............ B32B 38/0012 156/196 |
| 2017/0232790 A1* | 8/2017 | Hall ............ B60B 21/023 301/58 |
| 2018/0086136 A1* | 3/2018 | Chen ............ B60B 1/003 |

FOREIGN PATENT DOCUMENTS

| | | | | |
|---|---|---|---|---|
| CN | 105538999 B | * | 2/2018 | ......... B60B 1/003 |
| DE | 10351625 A1 | * | 7/2005 | ......... B60B 1/041 |
| DE | 202012105076 U1 | * | 3/2013 | ......... B60B 21/062 |
| EP | 1428685 A2 | * | 6/2004 | ......... B60B 21/025 |
| EP | 1491362 A1 | * | 12/2004 | ......... B60B 1/003 |
| EP | 1557292 A1 | * | 7/2005 | ......... B60B 1/041 |
| EP | 1894744 A1 | * | 3/2008 | ......... B60B 1/003 |
| EP | 2463117 A1 | * | 6/2012 | ......... B60B 1/041 |

OTHER PUBLICATIONS

Motorcycle Wheel Restoration, webpage <http://dannix.net/lib/moto/motorcycle-wheel-restoration> 18 pages, Sep. 9, 2016, retrieved from <http://dannix.net/lib/moto/motorcycle-wheel-restoration> on Feb. 28, 2023.

* cited by examiner

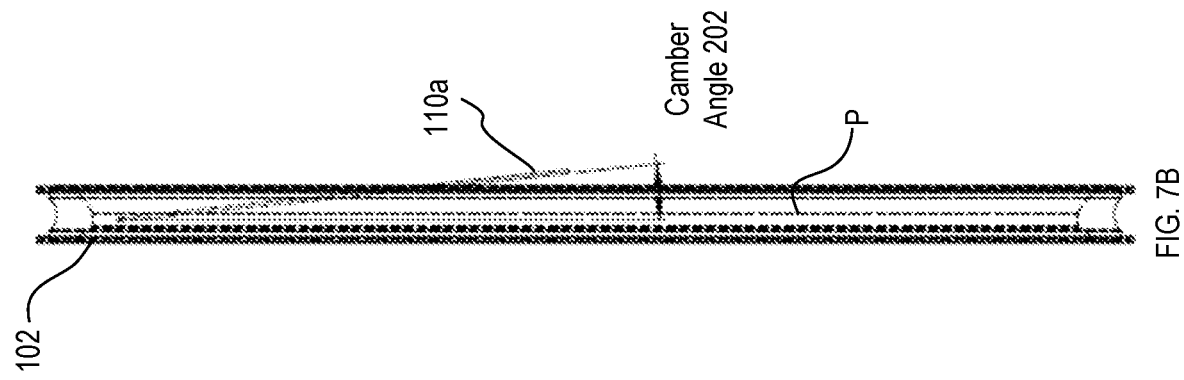
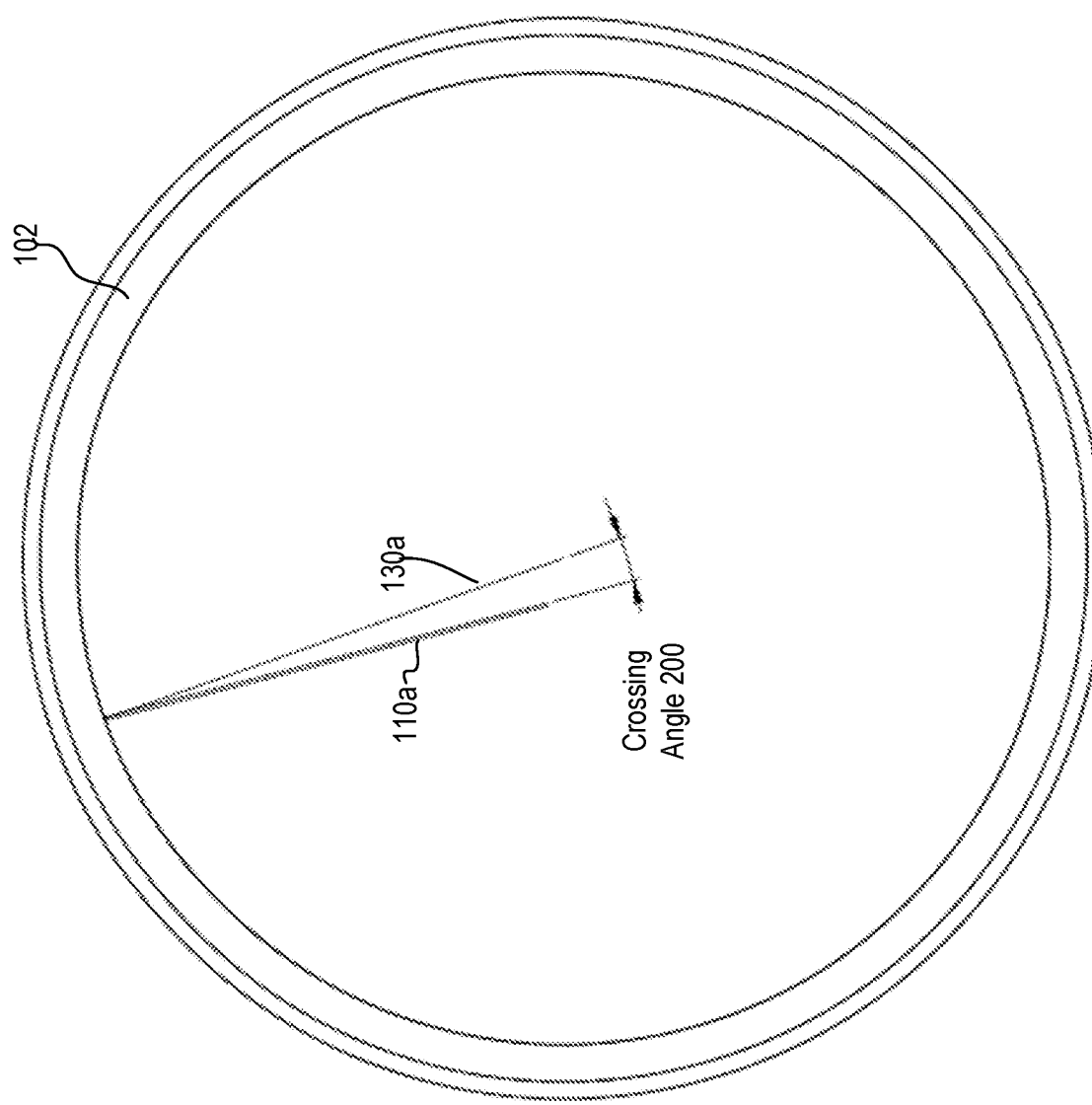

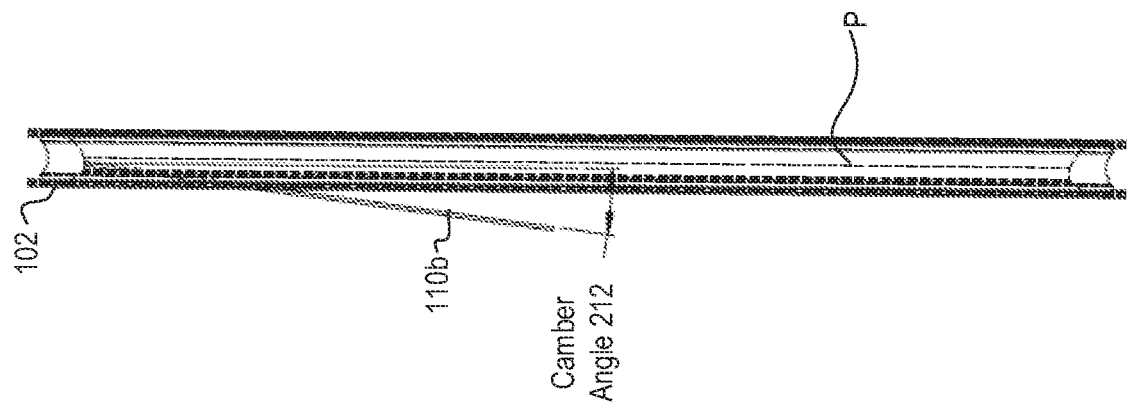
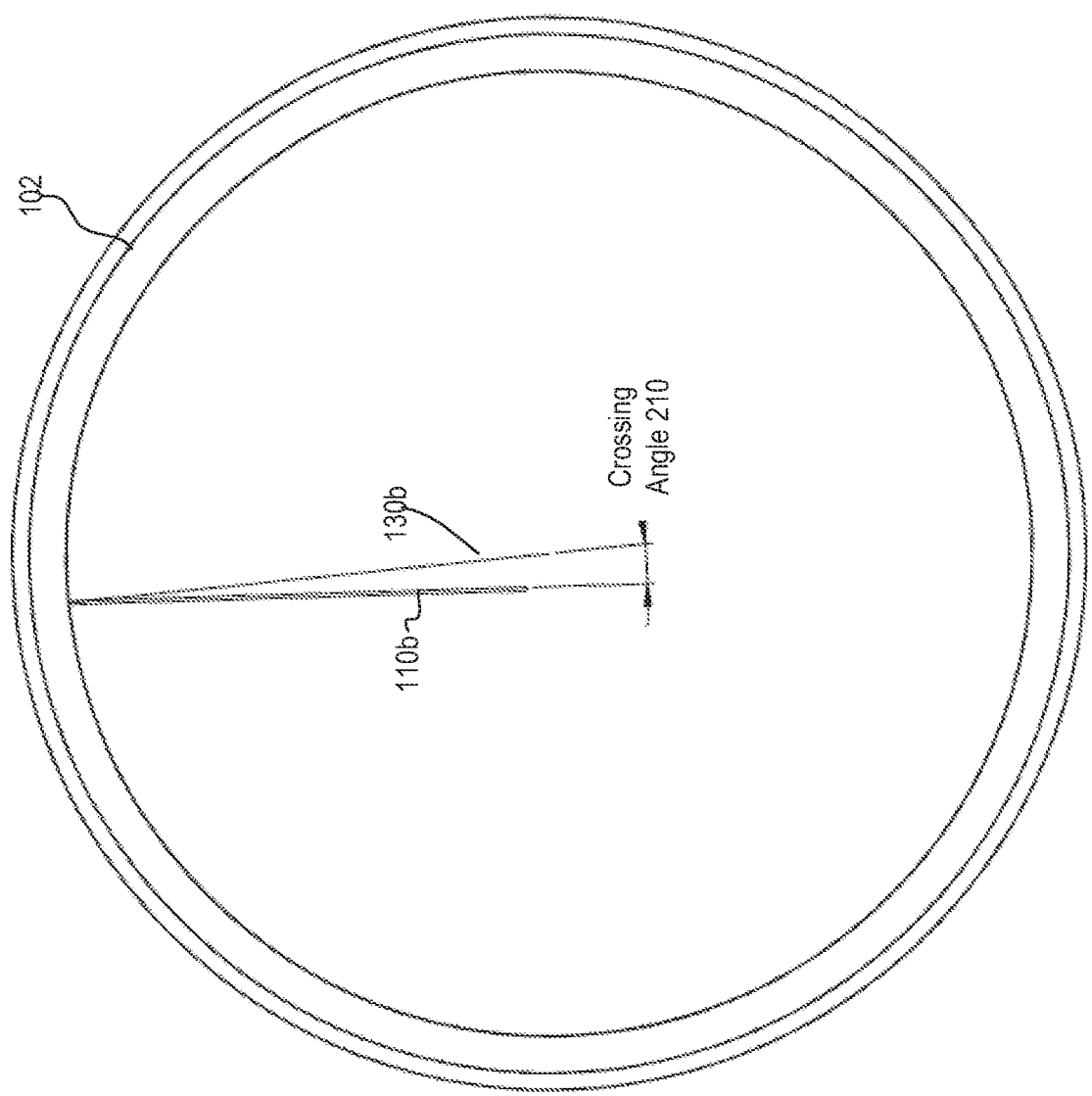

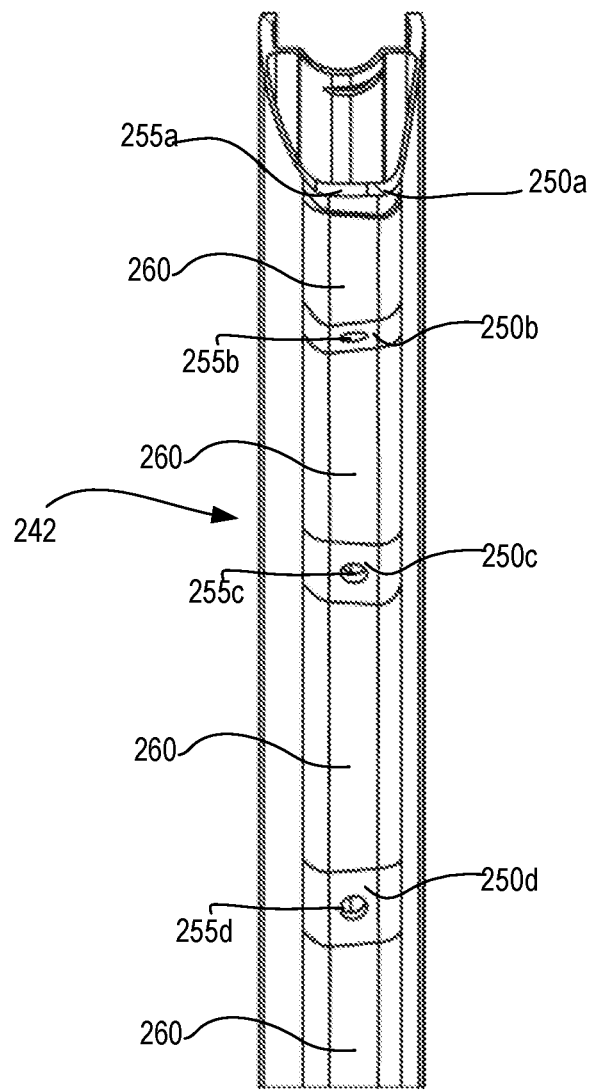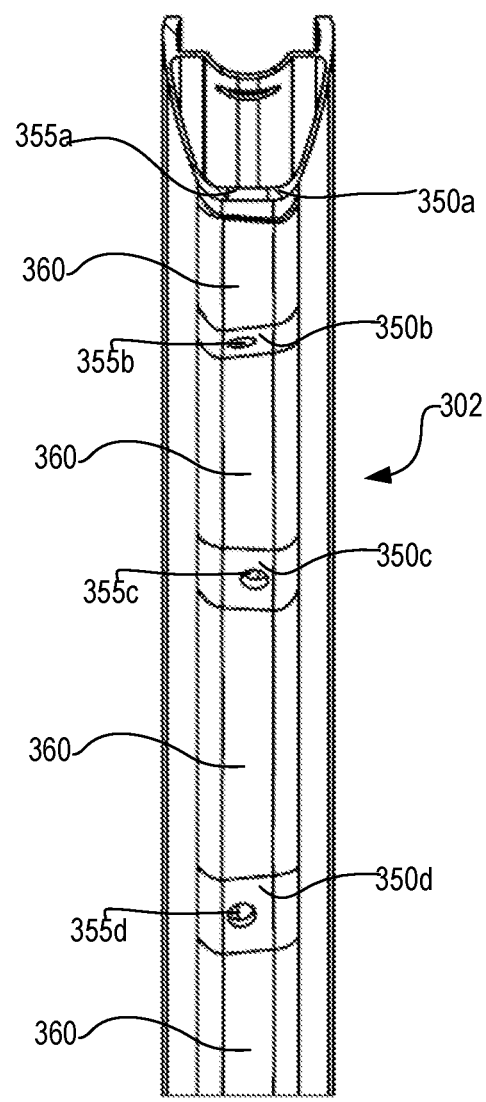
FIG. 14
FIG. 15

BICYCLE RIM ADAPTED TO REDUCE SPOKE FATIGUE

RELATED APPLICATIONS

This application claims priority under 35 U.S.C. § 119(e) to United States Provisional Patent Application No. 62/835,291, entitled "Bicycle Rim Adapted to Reduce Spoke Fatigue," filed Apr. 17, 2019, which is hereby fully incorporated herein by reference for all purposes.

TECHNICAL FIELD

This application relates generally to bicycle wheels. More particularly, some embodiments relate to rim structures having a spoke bed with a pattern of spoke attachment segments that are angled to achieve complex spoke angles.

BACKGROUND

Conventionally, the spoke attachment area of a bicycle rim includes a set of spoke openings for the passage of the internally threaded nipples that are used to attach the spokes to the rim. The spoke openings are typically bored or otherwise formed to have a radial bore axis aligned with the radius of the rim that intersects the rotational axis of the wheel. The longitudinal axes of the spoke nipples installed in the spoke opening are also radial—that is, aligned with the radius of the rim that intersects the rotational axis of the wheel. The spokes are bent and tensioned to achieve a desired spoke angle. Using the example of spoke openings formed along the centerline of the rim, the longitudinal axis of each spoke may deviate from a radial orientation relative to the intersection of the center plane of the rim by a complex spoke angle that comprises a combination of a camber angle (also referred to as bracing angle or inclination) and a crossing angle.

Bending and tensioning a spoke to achieve a desired spoke angle from the nipple to the hub may result in torsion on the nipple at the nipple opening. This can lead to uneven contact between the nipple and rim. For example, some areas on the inner side of the nipple head—that is the side of the nipple head that presses against the rim when the spoke is tensioned—may engage the rim while other portions of the head do not, leading to high point stress in certain areas of the rim. Moreover, stresses may tend to concentrate in the portion of the spoke proximate to the nipple. Concentrated stress may also occur in other areas of the rim or spoke due to the torsion. Such concentrated stress may lead to the spoke failing or the rim cracking.

What is desired, therefore, are mechanisms to better distribute stress and reduce fatigue on the spoke and rim. Even more particularly, what is desired are mechanisms to better distribute stress in rims formed of composite materials.

SUMMARY

Embodiments described herein provide a rim that is shaped to achieve such goals. Even more particularly, some embodiments described herein provide rims formed of composite materials that are adapted to better distribute stress and reduce spoke fatigue. In some embodiments, the rim is adapted so that spokes can be fastened to the rim using standard (off-the-shelf) nipples without additional bushes or alignment structures.

One embodiment includes a bicycle rim with a circumferential outer portion adapted to receive a tire. The bicycle rim includes a spoke bed comprising a pattern of spoke attachment segments at varying tilt angles spaced by intermediate segments. Each spoke attachment segment comprises an inner surface of the spoke attachment segment, an outer surface of the spoke attachment segment, and a spoke opening extending from the inner surface to the outer surface and sized to accommodate a spoke nipple. The spoke opening has a central axis angled at a complex angle that is a combination of a respective camber angle and a respective crossing angle. The outer surface and/or inner surface of the spoke attachment segment adjacent to the spoke opening extends perpendicular to the central axis of the spoke opening.

Another embodiment includes a bicycle wheel comprising a hub, a bicycle rim, a plurality of spokes and a plurality of spoke nipples. The bicycle rim includes a spoke bed comprising a pattern of spoke attachment segments at varying tilt angles spaced by intermediate segments. Each spoke attachment segment comprises an inner surface of the spoke attachment segment, an outer surface of the spoke attachment segment, and a spoke opening extending from the inner surface to the outer surface and sized to accommodate a spoke nipple. The spoke opening has a central axis angled at a complex angle that is a combination of a respective camber angle and a respective crossing angle. The outer surface and/or inner surface of the spoke attachment segment adjacent to the spoke opening extends perpendicular to the central axis of the spoke opening. Each of the plurality of spoke nipples is disposed in a respective spoke opening of a respective spoke attachment segment from the pattern of the spoke attachment segments. Each of the plurality of spokes is connected to a corresponding spoke nipple from the plurality of spoke nipples and extends at a spoke angle based on a respective complex angle of the respective spoke opening in which the corresponding spoke nipple is disposed.

According to one embodiment, the pattern of spoke attachment segments comprises a first spoke attachment segment having a first spoke opening with a first central axis at a first complex angle and a second spoke attachment segment having a second spoke opening with a second central axis at a second complex angle, wherein the first complex angle and second complex angle are different angles. The pattern of spoke attachment segments may further comprise a third spoke attachment segment having a third spoke opening with a third central axis at a third complex angle; and a fourth spoke attachment segment having a fourth spoke opening with a fourth central axis at a fourth complex angle. The first complex angle, second complex angle, third complex angle and fourth complex angle may be different complex angles.

According to one embodiment, the inner surface of each spoke attachment segment is parallel to the outer surface of the spoke attachment segment. By way of example, but not limitation, each spoke attachment segment is formed as a flat plate.

According to one embodiment, each intermediate segment has a twisted profile to transition between adjacent spoke attachment segments. According to one embodiment, the intermediate segments are thinner than the spoke attachment segments.

According to one embodiment, the bicycle rim is formed of a composite material.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 7A illustrates one embodiment of a crossing angle;

FIG. 7B illustrates one embodiment of a camber angle;

FIG. 9A illustrates one embodiment of a crossing angle;

FIG. 9B illustrates one embodiment of a camber angle;

FIG. 14 illustrates a cross-sectional view one embodiment of a rim with an asymmetrical arrangement of spoke openings;

FIG. 15 illustrates a cross-sectional view one embodiment of a rim with offset spoke openings;

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of a bicycle wheel include a spoke bed comprising a repeating pattern of spoke attachment segments tilted at different angles. The spoke attachment segments may each comprise a spoke opening to receive a spoke and/or spoke nipple. Each spoke attachment segment is tilted so that the respective spoke opening is angled to match a respective complex spoke angle. The surfaces adjacent to the spoke opening extend perpendicular to the spoke opening for some distance (e.g., so that each spoke nipple abuts a surface that is perpendicular to the corresponding spoke). In one embodiment, the length and width of a spoke attachment segment are approximately three to four times the diameter of the respective spoke opening. The spoke segments may be spaced by intermediate segments that twist from one spoke attachment segment to the next.

Figure 1:
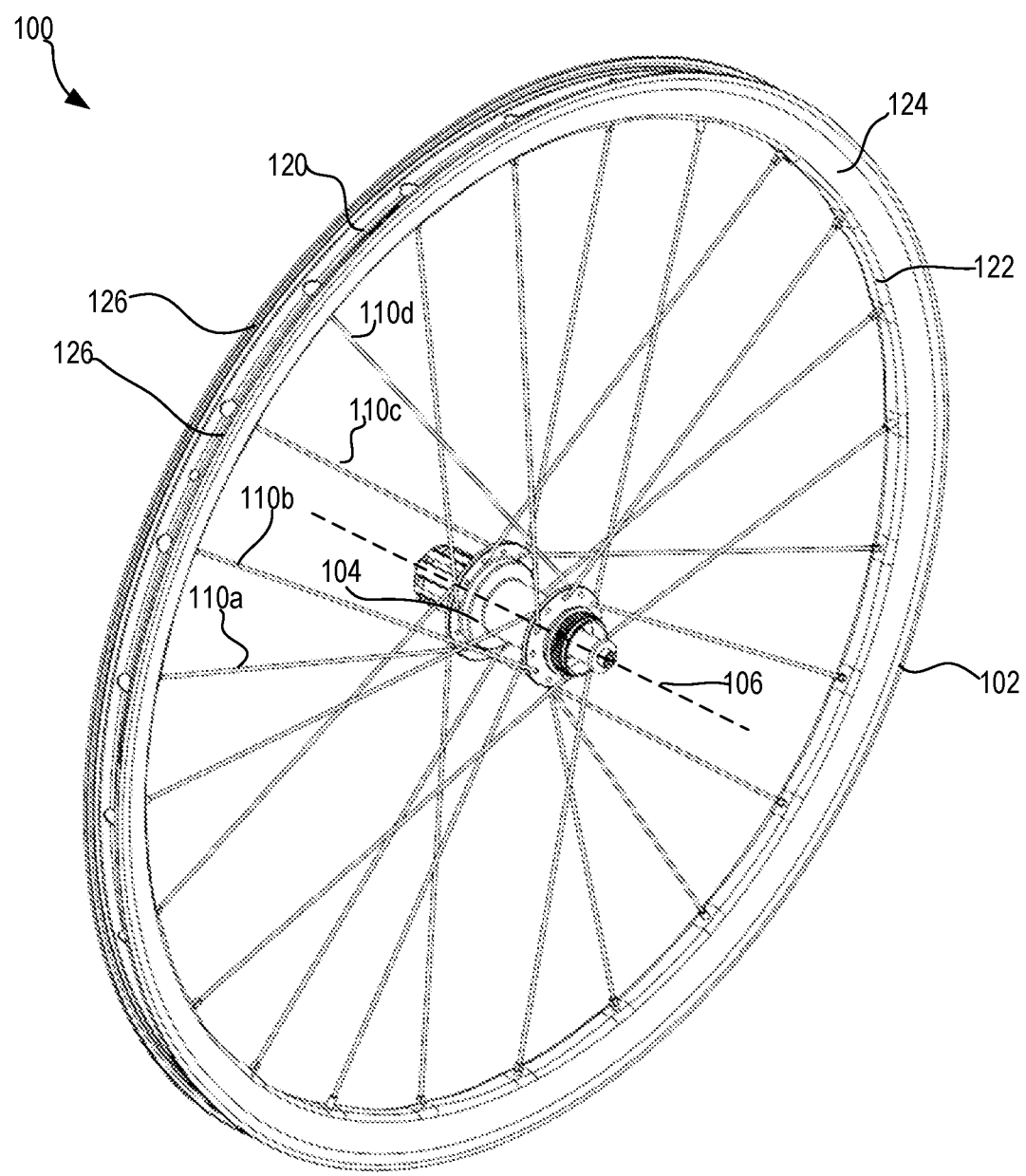
FIG. 1 illustrates a portion of a one embodiment of a wheel.
Figure 2:
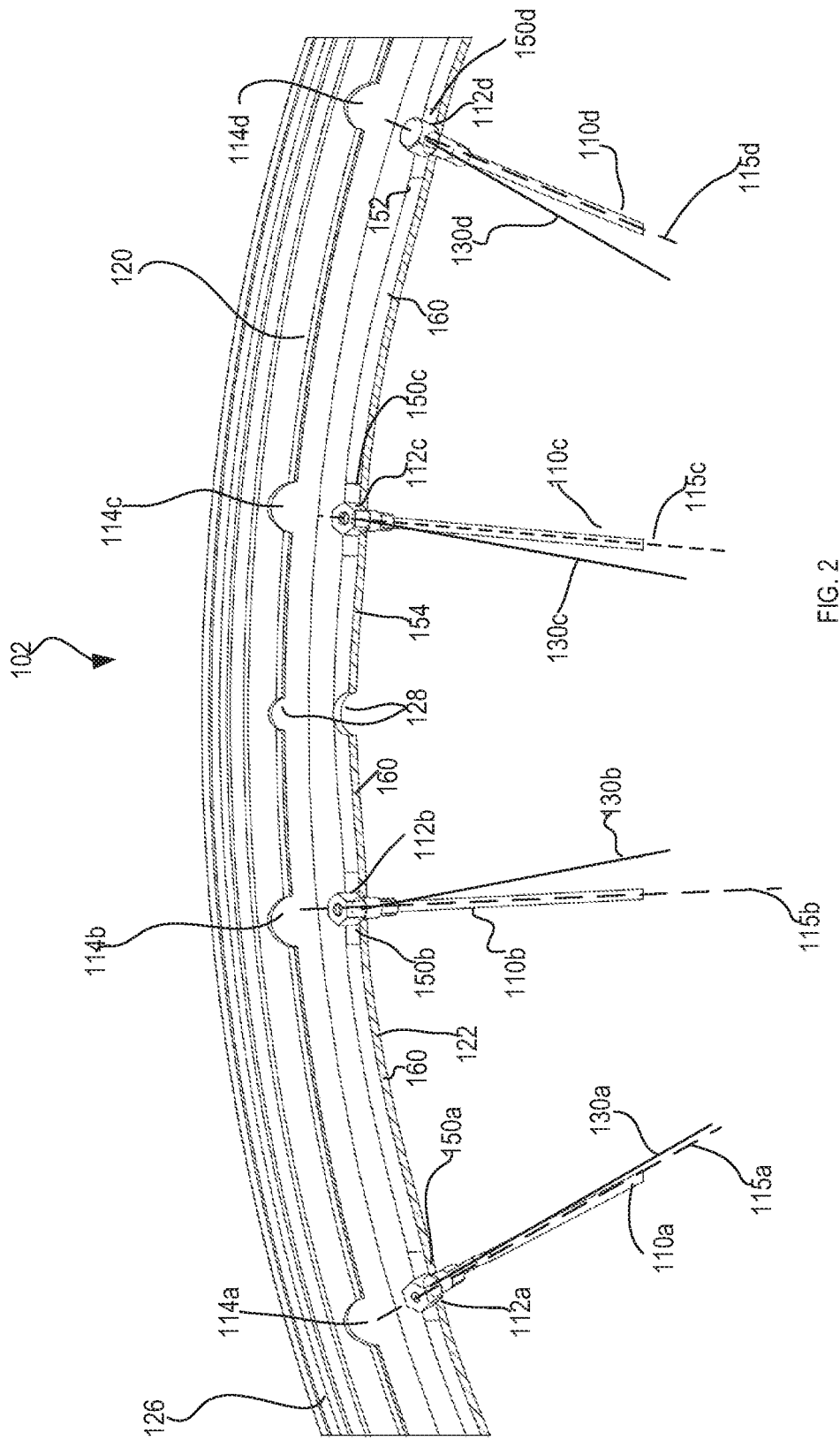
FIG. 2 is first cut-away view of one embodiment of a portion of a wheel.

FIG. 1 illustrates one embodiment of a wheel 100. Wheel 100 comprises a rim 102 connected to a hub 104 by spokes. FIG. 2 illustrates a cut-away view of a portion of wheel 100 and FIG. 3 illustrates a second cut-away view of a portion of wheel 100.

Rim 102 includes a radially outer wall 120, a radially inner wall 122 and sidewalls 124. Radially outer wall 120 and sidewalls 124 may form an area to seat a tire and sidewalls 124 may include features 126, such as wings or ribs, for holding a tire. While FIG. 1 illustrates a rim suitable for a clincher tire, other embodiments may be adapted for use with a tubular tire.

As mentioned above, rim 102 is connected to hub 104 by spokes. In the illustrated embodiment, the spoke pattern includes twenty-four spokes that is made up of a repeating pattern exemplified by the indicated spokes 110a, 110b, 110c and 110d. The number of spokes and spoke pattern are provided by way of example and not limitation. In any case, the spoke angle of each spoke may deviate from a radial orientation relative to the intersection of the middle plane of rim 102 and the rotational axis 106 of the wheel by a complex angle that comprises a respective camber angle and respective crossing angle. As discussed below, rim 102 includes a spoke bed with spoke attachment segments adapted to reduce fatigue on rim 102 and the spokes.

Figure 3:
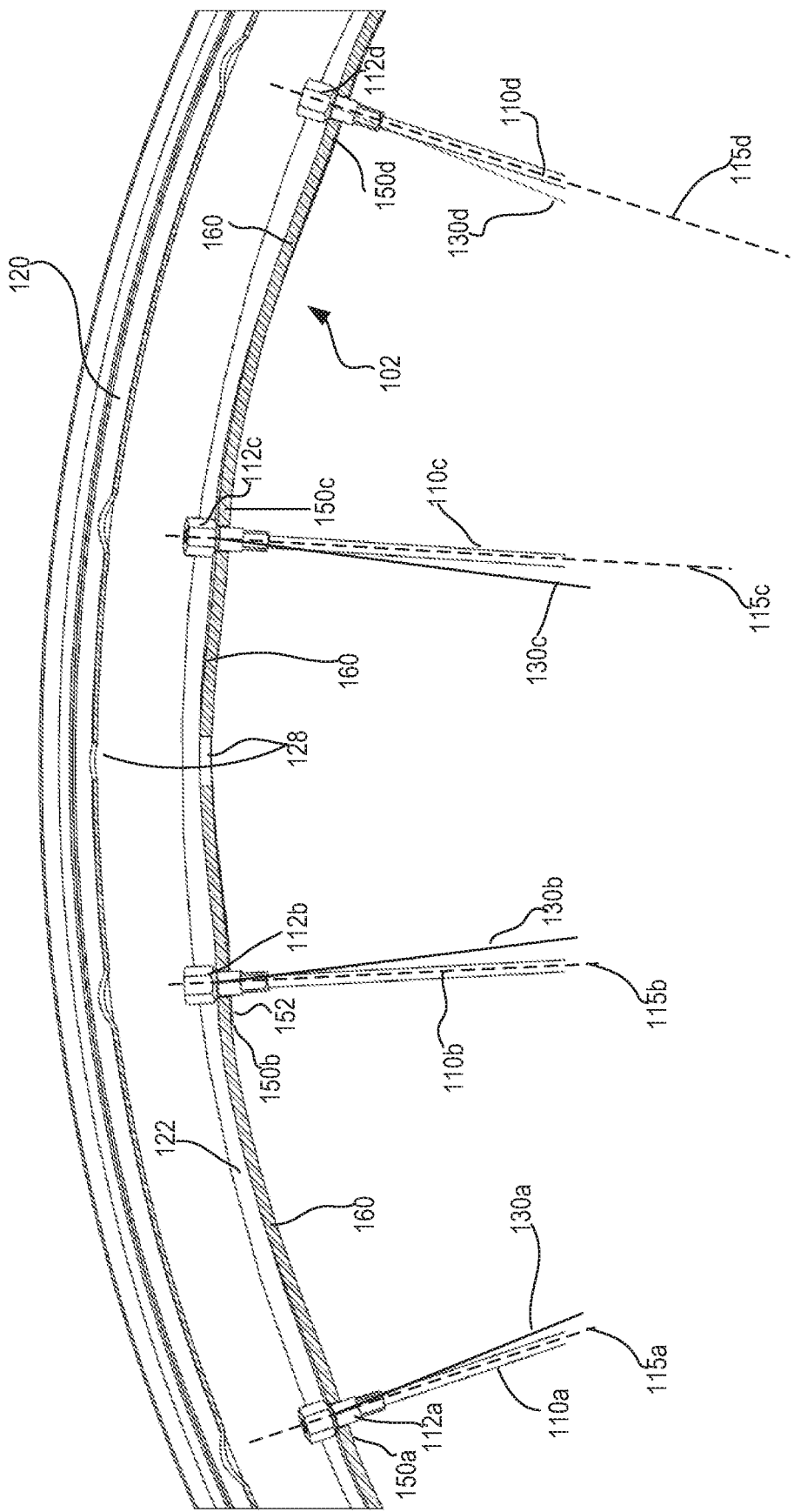
FIG. 3 is second cut-away view of one embodiment of a portion of a wheel.

With further reference to FIGS. 2-3, inner wall 122 forms a spoke bed and includes a series of spoke openings running from a radially outer surface 152 to a radially inner surface 154 to accommodate spoke nipples (e.g., nipple 112a, nipple 112b, nipple 112c and nipple 112d are indicated). Outer wall 120 includes access openings to allow access to respective nipples so that spokes may be tightened (e.g., access openings 114a, 114b, 114c, 114d are indicated). Outer wall 120 and inner wall 122 may also include valve openings 128 to allow a tire valve to pass through rim 102.

An end portion of each spoke may be threaded and received in an internally threaded bore of the respective nipple. When installed and tensioned, each spoke may have a longitudinal axis that deviates from the radial orientation. For example, longitudinal axis 115a of spoke 110a deviates from the radial orientation 130a, longitudinal axis 115b of spoke 110b deviates from the radial orientation 130b, longitudinal axis 115c of spoke 110c deviates from the radial orientation 130c; longitudinal axis 115d of spoke 110d deviates from the radial orientation 130d.

Rim 102 includes a spoke bed (e.g., formed by radially inner wall 122) comprising a pattern of spoke attachment segments spaced by intermediate segments 160. As will be appreciated, the number of spoke attachment segments can depend on the number of spokes. For example, the spoke bed of wheel 100 can include a pattern of four spoke attachment segments 150a, 150b, 150c, 150d that repeats six times to accommodate twenty-four spokes.

Figure 4:
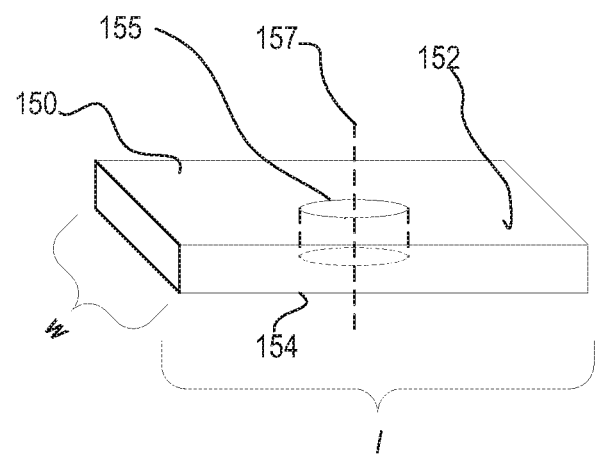
FIG. 4 is a diagrammatic representation of one embodiment of a spoke attachment segment.

With reference to FIG. 4, each spoke attachment segment 150 (e.g., spoke attachment segments 150a, 150b, 150c and 150d) may be a segment of a rim wall (e.g., rim wall 122) that includes a spoke opening 155 running from a radially outer surface 152 to a radially inner surface 154. Each spoke opening 155 can be sized to accommodate a spoke nipple. Each spoke attachment segment 150 may have a respective outer surface 152 and inner surface 154, which respectively may be portions of the radially outer surface of wall (e.g., wall 122) and the radially inner surface of the wall (e.g., wall 122). The shape of outer surface 152 adjacent to spoke opening 155 can be selected so that the shoulder of the nipple head asserts substantially even pressure on surface 152 about opening 155. According to one embodiment, radially outer surface 152 adjacent to opening 155 may be flat and extend perpendicular to the central axis 157 of spoke opening 155 for some distance. In some embodiments, radially inner surface 154 may be parallel to radially outer surface 152 about opening 155. As such, each spoke attachment segment 150 may be a wall segment having the shape of a flat plate having a length (l) and a width (w) with a spoke opening 155 therethrough. In other embodiments, spoke attachment segments 150 may have other shapes.

Each spoke attachment segment 150 may be tilted such the respective portion of the radially outer surface 152 and/or radially inner surface 154 adjacent to the spoke opening 155 is tilted relative to the axis of rotation 106 and is not perpendicular to the radius of the rim. Each spoke attachment segment 150 may be tilted such that the respective spoke opening 155 central axis 157 is oriented, so far as possible, at a complex angle to match the spoke angle of the respective spoke. For example, spoke attachment segment 150a can be angled so that the central axis of the spoke opening therethrough is at the desired spoke angle of spoke 110a, spoke attachment segment 150b can be angled so that the central axis of the spoke opening therethrough is at the desired spoke angle of spoke 110b and so on.

Thus, the longitudinal axis of each spoke may align with the central axis of the respective spoke opening and the spoke can remain straight from the portion that couples to the nipple along a substantial length of the spoke without bending. Thus, spokes can be installed without requiring bending at or proximate to the respective nipples. As will be appreciated, a spoke may be bent proximate to the hub to attach the spoke to the hub.

Figure 5:
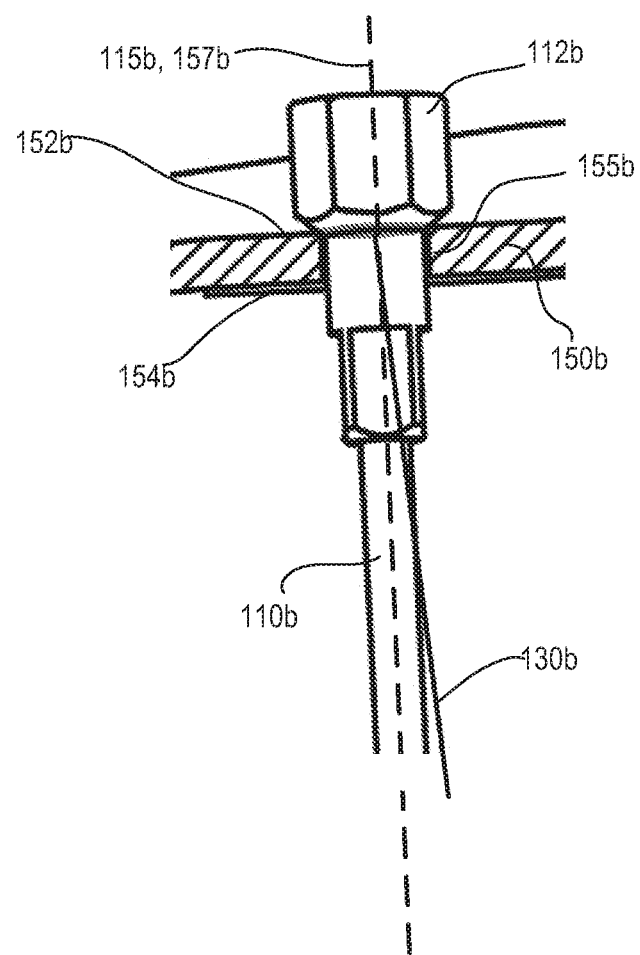
FIG. 5 illustrates a cross-sectional view of one embodiment of a spoke attachment segment and a portion of a spoke.

FIG. 5 illustrates a cross-section of a portion of wheel 100 in more detail. Spoke attachment segment 150b includes a spoke opening 155b passing from radially outer surface 152 to radially inner surface 154. Nipple 112b is received in spoke opening 155b and spoke 110b is threaded into nipple 112b. Spoke attachment segment 150b is tilted such that the central axis 157b of spoke opening 155b is at a complex angle to account for the camber angle and crossing angle of spoke 110b. As such, central axis 157b and the longitudinal axis 115b can align when spoke 110b is installed and tensioned. The section of radially outer surface 152 and radially inner surface 154 adjacent to opening 155b extends perpendicular to central axis 157 a selected distance, preferably at least past the head of the nipple.

It will be appreciated that the number and angles of the respective spoke attachment segments 150 can depend on the anticipated spoke pattern. In FIG. 1, for example, wheel 100 has 24 spokes having six sets of four spokes. In this example, the spoke bed may have a repeating pattern of four spoke attachment segments with each segment in the pattern adapted to accommodate a different combination of camber angle and crossing angle. In other words, each spoke attachment segment in the pattern may have a spoke opening central axis at a different complex angle. The pattern of segments can repeat six times to accommodate the twenty-four spokes.

Figure 6:
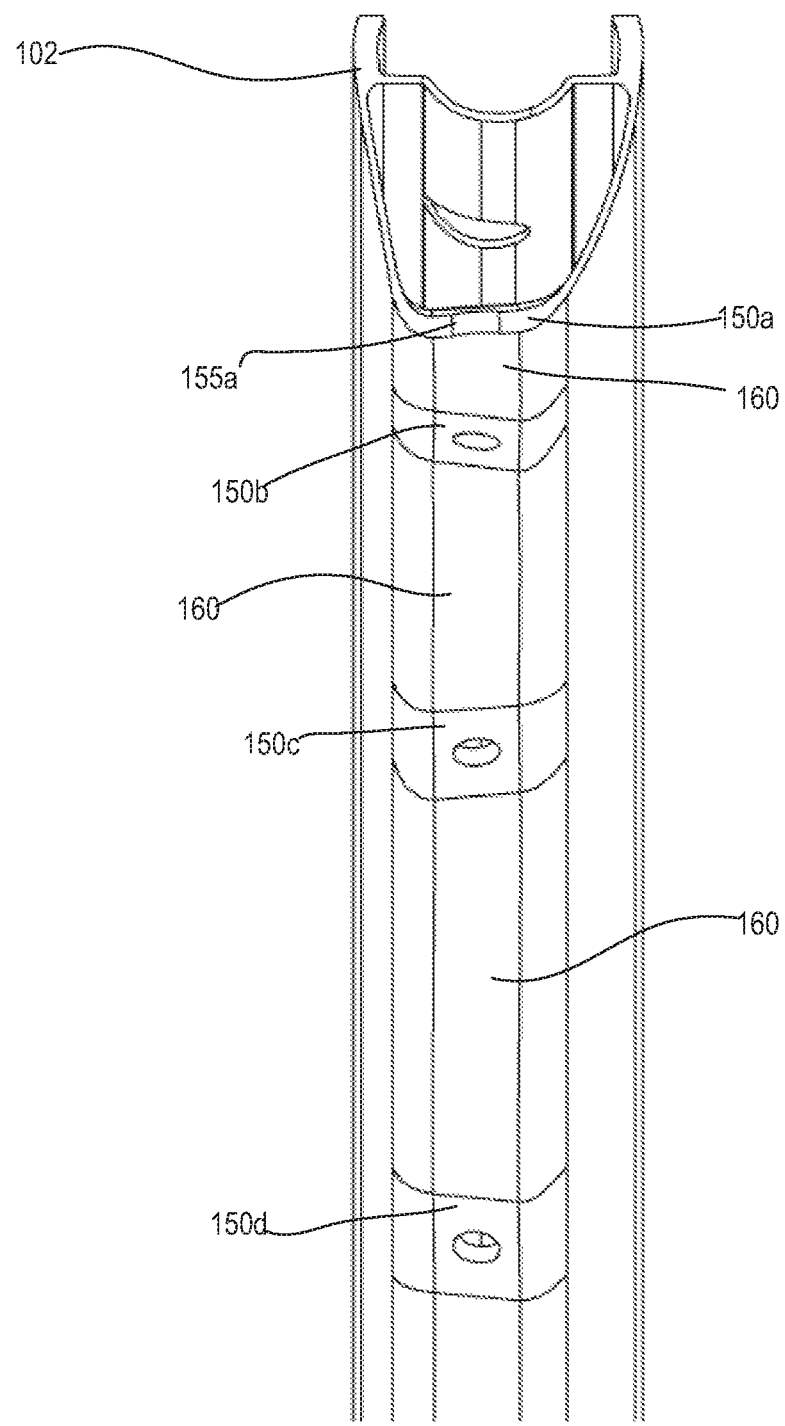
FIG. 6 illustrates a cross-sectional view of a first portion of one embodiment of a rim.

FIG. 6 illustrates a cross-section of rim 102 showing an embodiment of spoke attachment segment 150a with spoke opening 155a. Spoke attachment segment 150a is tilted so that spoke opening 155a is angled at a first complex angle. By way of example, but not limitation, spoke attachment segment 150a may be adapted so that spoke 110a has a complex spoke angle that is a combination of a first crossing angle 200 as illustrated in FIG. 7A and a first camber angle 202 as illustrated in FIG. 7B (P represents the center or middle plane of rim 102). In the illustrated embodiment, spoke 110a runs laterally outward to a first side of the wheel—for example, connects rim 102 to a first hub flange—and has a crossing angle of approximately 4.82 degrees and a camber angle of approximately 6.12 degrees from a plane perpendicular to the rotational axis of rim 102.

Figure 8:
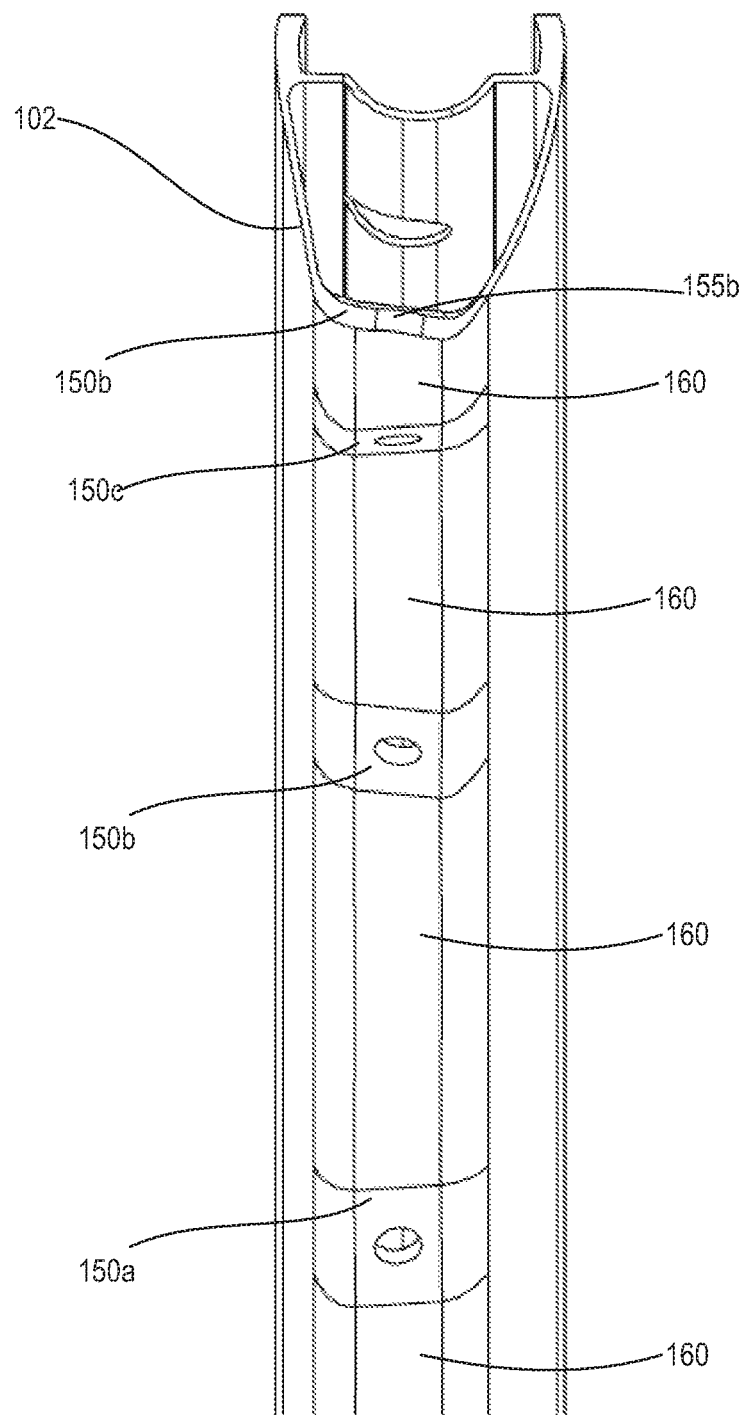
FIG. 8 illustrates a cross-sectional view of a second portion of one embodiment of a rim.

FIG. 8 illustrates a cross-section of rim 102 showing an embodiment of spoke attachment segment 150b with spoke opening 155b. Spoke attachment segment 150b is tilted so that spoke opening 155b is angled at a second complex angle. By way of example, but not limitation, spoke attachment segment 150b may be adapted so that spoke 110b has a complex spoke angle that is a combination of a second crossing angle 210 as illustrated in FIG. 9A and a second camber angle 212 as illustrated in FIG. 9B (P represents the middle plane of rim 102). In the illustrated embodiment, spoke 110b runs laterally outward to a second side of the wheel—for example, connects rim 102 to a second hub flange—and has a crossing angle of approximately 4.82 degrees and a camber angle of approximately 7.34 degrees from a plane perpendicular to the rotational axis of rim 102.

Figure 10:
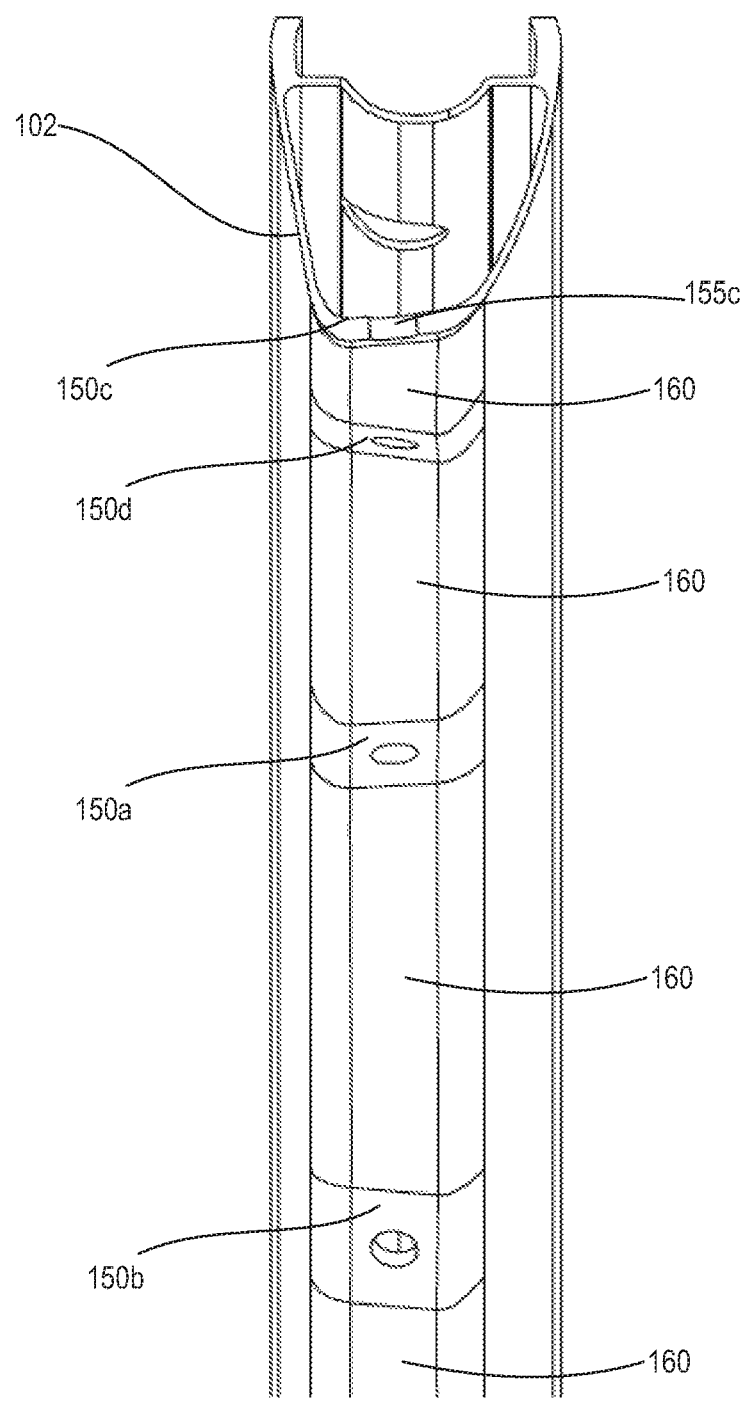
FIG. 10 illustrates a cross-sectional view of a third portion of one embodiment of a rim.
Figure 11B:
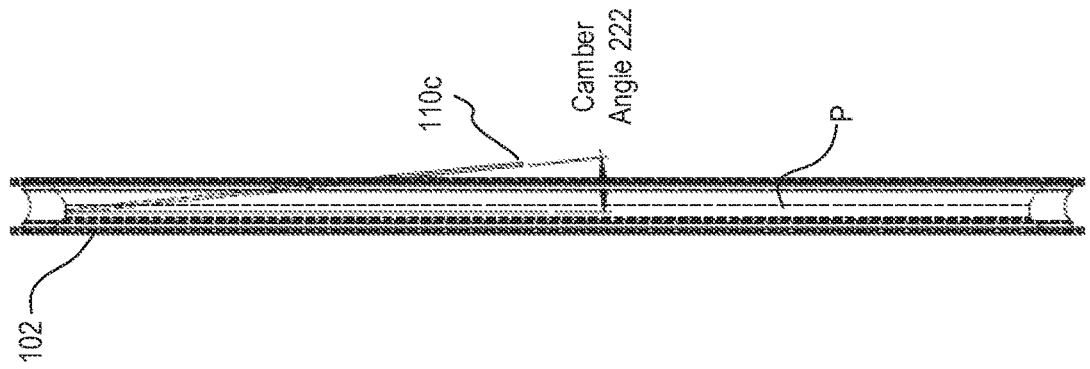
FIG. 11B illustrates one embodiment of a camber angle.
Figure 11A:
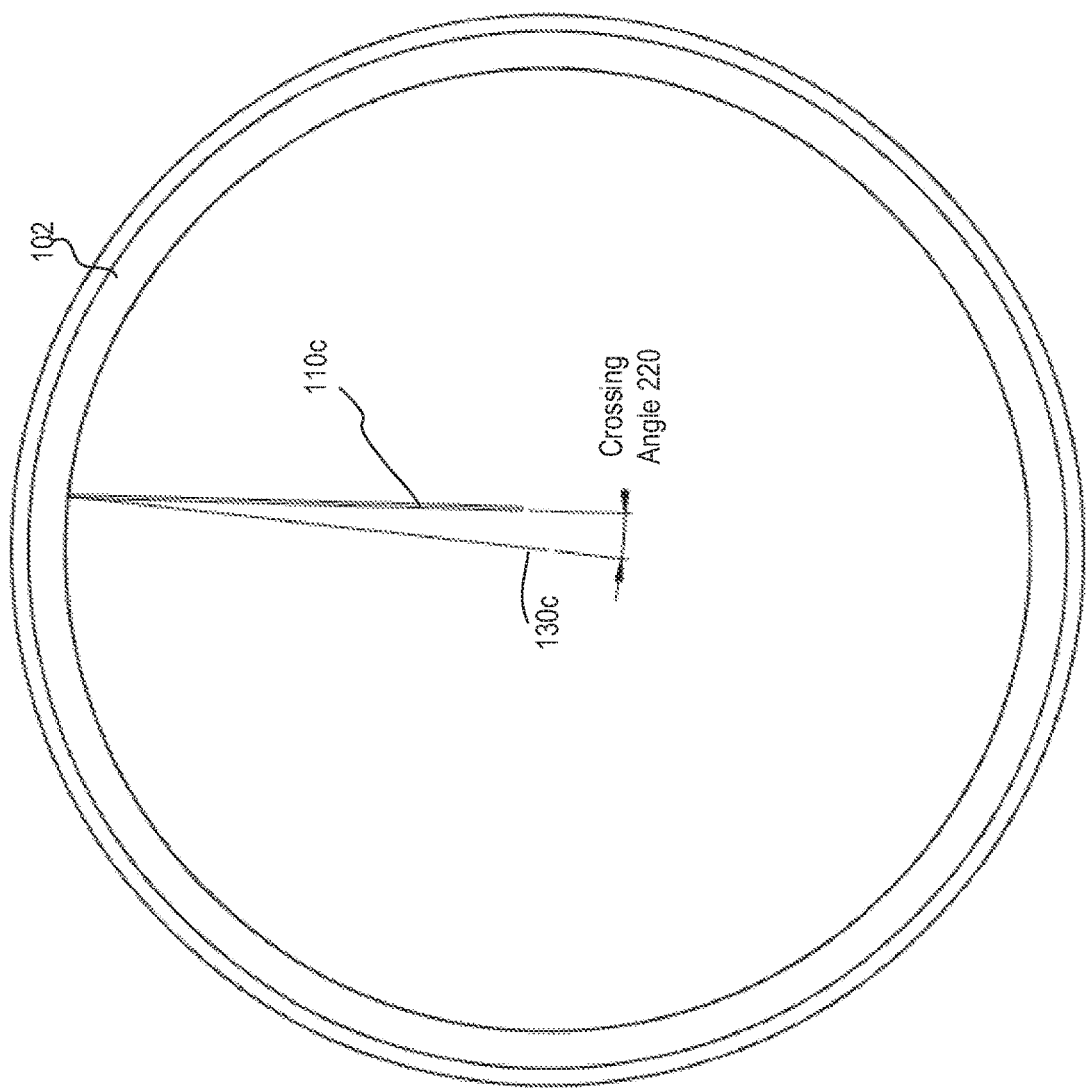
FIG. 11A illustrates one embodiment of a crossing angle.

FIG. 10 illustrates a cross-section of rim 102 showing an embodiment of spoke attachment segment 150c with spoke opening 155c. Spoke attachment segment 150c is tilted so that spoke opening 155c is angled at a third complex angle. By way of example, but not limitation, spoke attachment segment 150c may be adapted so that spoke 110c has a complex spoke angle that is a combination of a third crossing angle 220 as illustrated in FIG. 11A and a third camber angle 222 as illustrated in FIG. 11B (P represents the middle plane of rim 102). In the illustrated embodiment, spoke 110c runs laterally outward to a first side of the wheel—for example, connects rim 102 to the first hub flange—and has a crossing angle of approximately 4.82 degrees and a camber angle of approximately 5.93 degrees from a plane perpendicular to the rotational axis of rim 102.

Figure 12:
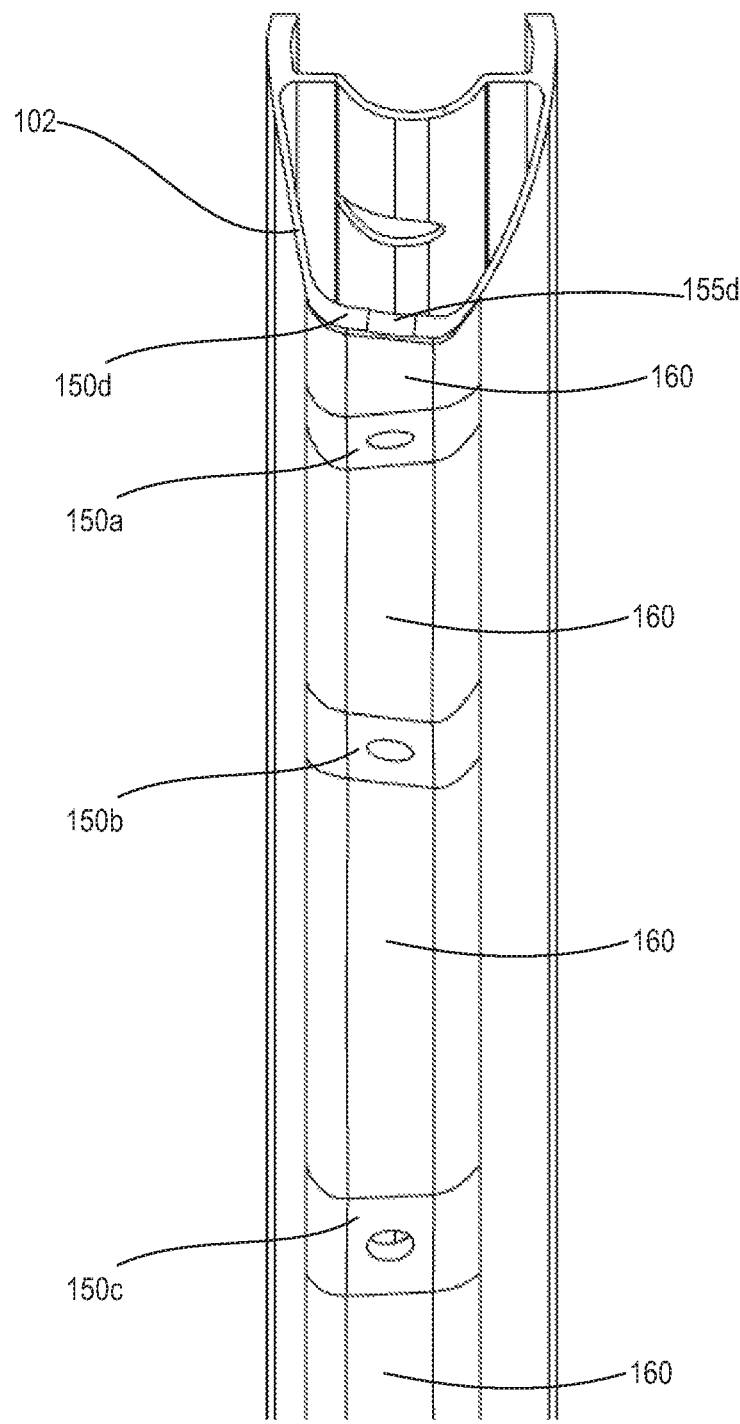
FIG. 12 illustrates a cross-sectional view of a fourth portion of one embodiment of a rim.
Figure 13B:
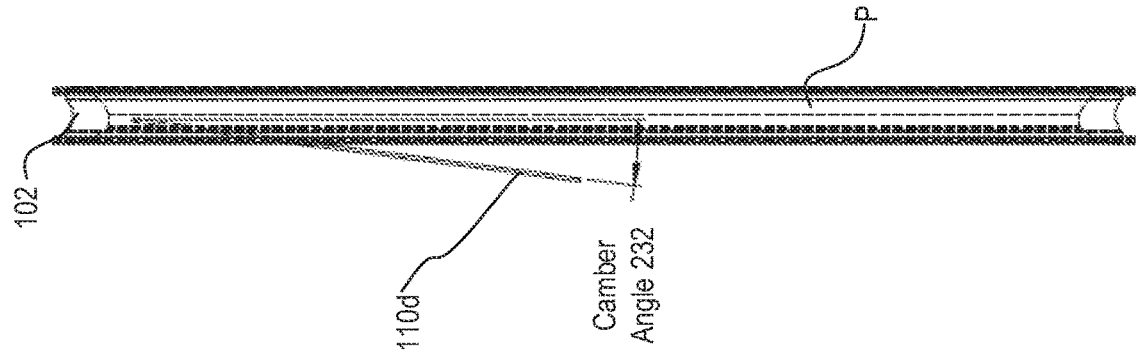
FIG. 13B illustrates one embodiment of a camber angle.
Figure 13A:
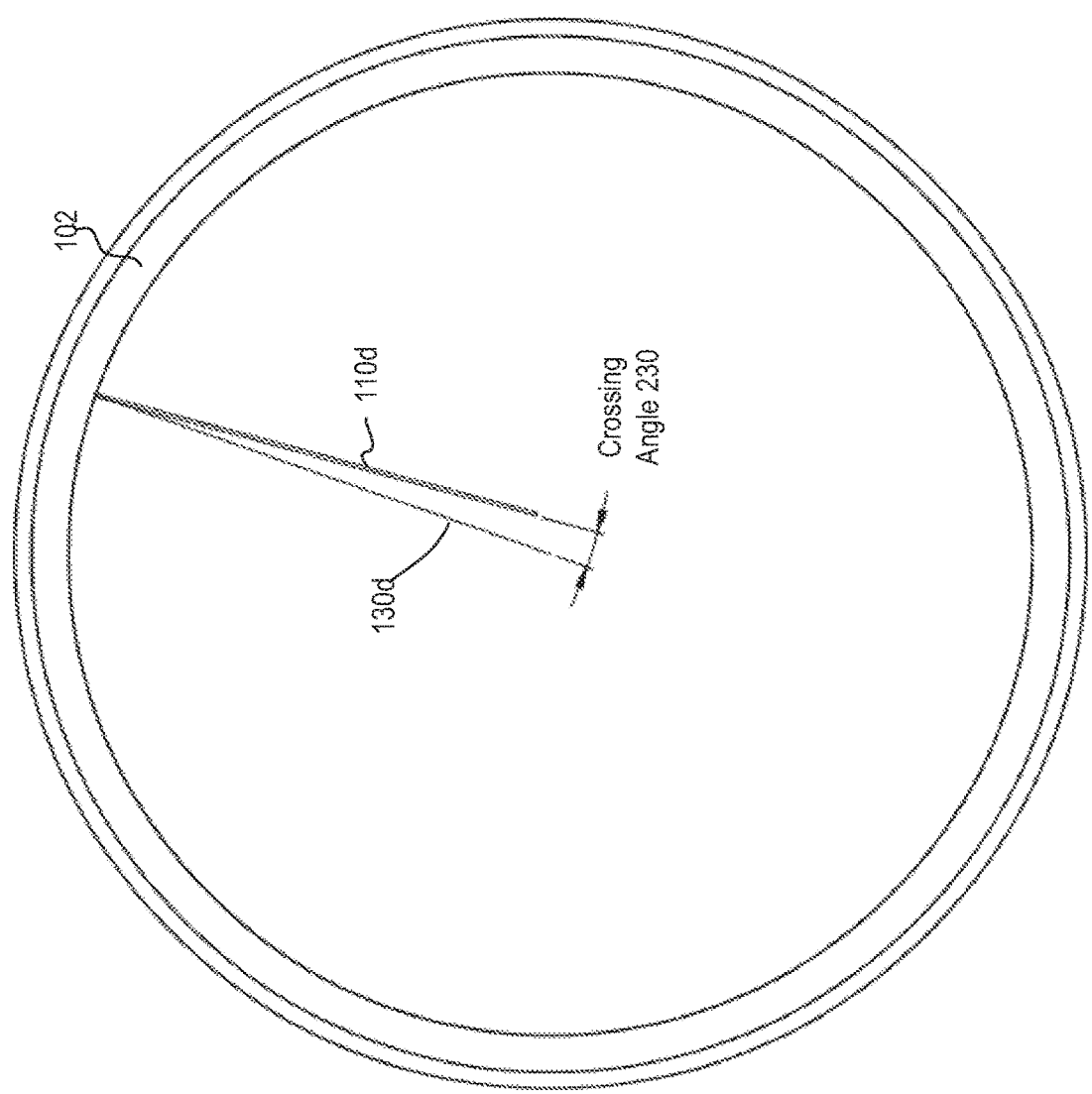
FIG. 13A illustrates one embodiment of a crossing angle.

FIG. 12 illustrates a cross-section of rim 102 showing an embodiment of spoke attachment segment 150d with spoke opening 155d. Spoke attachment segment 150d is tilted so that spoke opening 155d is angled at a fourth complex angle. By way of example, but not limitation, spoke attachment segment 150d may be adapted so that spoke 110d has a complex spoke angle that is a combination of a fourth crossing angle 230 as illustrated in FIG. 13A and a fourth camber angle 232 as illustrated in FIG. 11B (P represents the middle plane of rim 102). In the illustrated embodiment, spoke 110c runs laterally outward to a second side of the wheel—for example, connects rim 102 to the second hub flange—and has a crossing angle of approximately 4.12 degrees and a camber angle of approximately 7.59 degrees from a plane perpendicular to the rotational axis of rim 102.

It can be noted that, in some embodiments, the intermediate segments 160 may have a similar thickness to the spoke attachment segments. In other embodiments, the intermediate segments 160 may be thicker or thinner than the spoke attachment segments. The intermediate segments 160 can have a twisted shape to transition from one spoke attachment segment 150 to the next. For example, the wall 122 can twist at intermediate segment 160 between spoke attachment segment 150a and spoke attachment segment 150b to transition from the complex tilt of spoke attachment segment 150a to spoke attachment segment 150b. According to one embodiment, the tilt of the radial cross-section of intermediate segments 160 is continually changing to transition from one spoke attachment segment to the next. The tilt may be continually changing with respect to axis 106 is coincident and/or perpendicular to the radius.

It will be appreciated that the foregoing embodiments are provided by way of example and not limitation and the number and angle of spoke attachment segments, offset of spoke openings and other aspects of a rim may vary based on the spoke pattern to be accommodated and other factors.

In embodiment illustrated in FIG. 1, the spoke openings are generally aligned on the centerline of rim 102. In other embodiments, the spoke openings may be laid out in an asymmetric pattern or other pattern in which at least some of the spoke openings are offset from the centerline. For example, FIG. 14 illustrates a cross-sectional view of a portion of a bicycle wheel rim 242 having spoke attachment segments 250a, 250b, 250c, 250d and intermediate segments 260. Each spoke attachment segment 250a, 250b, 250c, 250d has a respective spoke opening 255a, 255b, 255c, 255d to receive a nipple. As discussed above, each spoke attachment segment 250a, 250b, 250c, 250d can be tilted so that the central axis of the respective spoke opening 355a, 355b, 355c, 255d aligns with a desired complex angle. Here, the central axis of each spoke opening falls on the same side of the center line of rim 242. It will be appreciated that the embodiment of FIG. 14 is provided by way of example and not limitation and the number and angle of spoke attachment segments, offset of spoke openings and other aspects of a rim may vary based on the spoke pattern to be accommodated and other factors.

For example, FIG. 15 illustrates a cross-sectional view of a portion of a bicycle wheel rim 302 having spoke attachment segments 350a, 350b, 350c, 350d and intermediate segments 360. Each spoke attachment segment 350a, 350b, 350c, 350d has a respective spoke opening 355a, 355b, 355c, 355d to receive a nipple. As discussed above, each spoke attachment segment 350a, 350b, 350c, 350d can be tilted so that the central axis of the respective spoke opening 355a, 355b, 355c, 355d aligns with a desired complex angle. Here, the spoke openings 355a, 355b, 355c, 355d are offset from the centerline of rim 302. It will be appreciated that the embodiment of FIG. 15 is provided by way of example and not limitation and the number and angle of spoke attachment segments, offset of spoke openings and other aspects of a rim may vary based on the spoke pattern to be accommodated and other factors.

Figure 16:
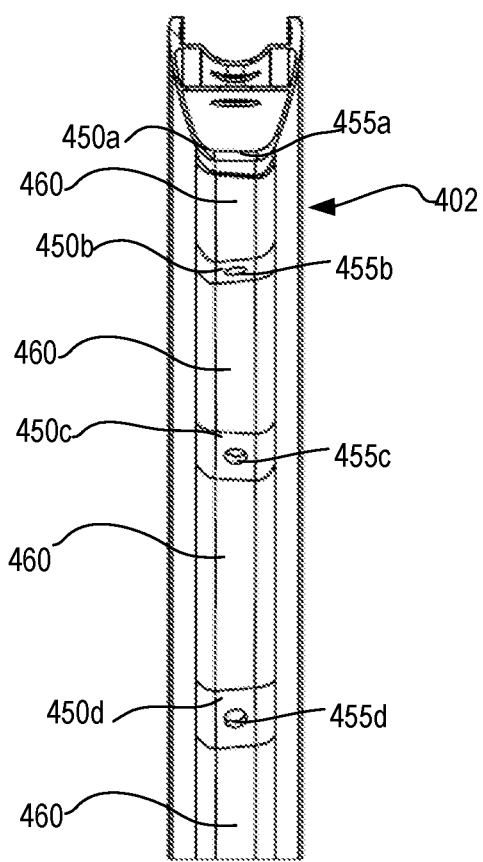
FIG. 16 illustrates a cross-sectional view of one embodiment of a triple wall rim.

Embodiments may be implemented in a variety of rim designs. FIG. 16, for example, illustrates an embodiment of a triple wall bicycle wheel rim 402. Bicycle rim 402 has a spoke bed comprising spoke attachment segments 450a, 450b, 450c, 450d and intermediate segments 460. Each spoke attachment segment 450a, 450b, 450c, 450d has a respective spoke opening 455a, 455b, 455c, 455d to receive a nipple. As discussed above, each spoke attachment segment 450a, 450b, 450c, 450d can be tilted so that the central axis of the respective spoke opening 455a, 455b, 455c, 455d aligns with a desired complex angle. In the illustrated embodiment, the spoke openings 455a, 455b, 455c, 455d are generally aligned with the centerline of rim 402. In other embodiments, the spoke openings may be offset from the centerline of rim 402. It will be appreciated that the embodiment of FIG. 16 is provided by way of example and not limitation and the number and angle of spoke attachment segments, offset of spoke openings and other aspects of a rim may vary based on the spoke pattern to be accommodated and other factors.

Figure 17:
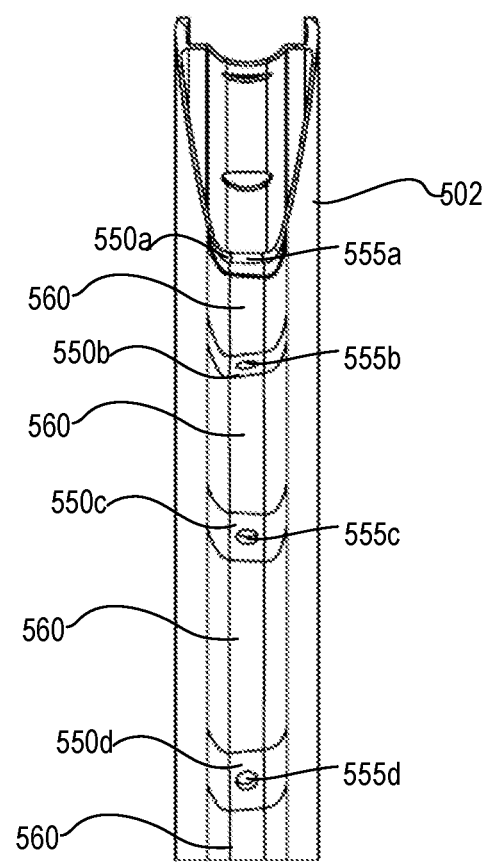
FIG. 17 illustrates a cross-sectional view of one embodiment of rim with a deep aero profile.

FIG. 17 illustrates an embodiment of a bicycle wheel rim 502 with a deep aero profile. Bicycle rim 502 has a spoke bed comprising spoke attachment segments 550a, 550b, 550c, 550d and intermediate segments 560. Each spoke attachment segment 550a, 550b, 550c, 550d has a respective spoke opening 555a, 555b, 555c, 555d to receive a nipple. As discussed above, each spoke attachment segment 550a, 550b, 550c, 550d can be tilted so that the central axis of the respective spoke opening 555a, 555b, 555c, 555d aligns with a desired complex angle. In the illustrated embodiment, the spoke openings 555a, 555b, 555c, 555d are generally aligned with the centerline of rim 502. In other embodiments, the spoke openings may be offset from the centerline of rim 502. It will be appreciated that the embodiment of FIG. 17 is provided by way of example and not limitation and the number and angle of spoke attachment segments, offset of spoke openings and other aspects of a rim may vary based on the spoke pattern to be accommodated and other factors.

Figure 18:
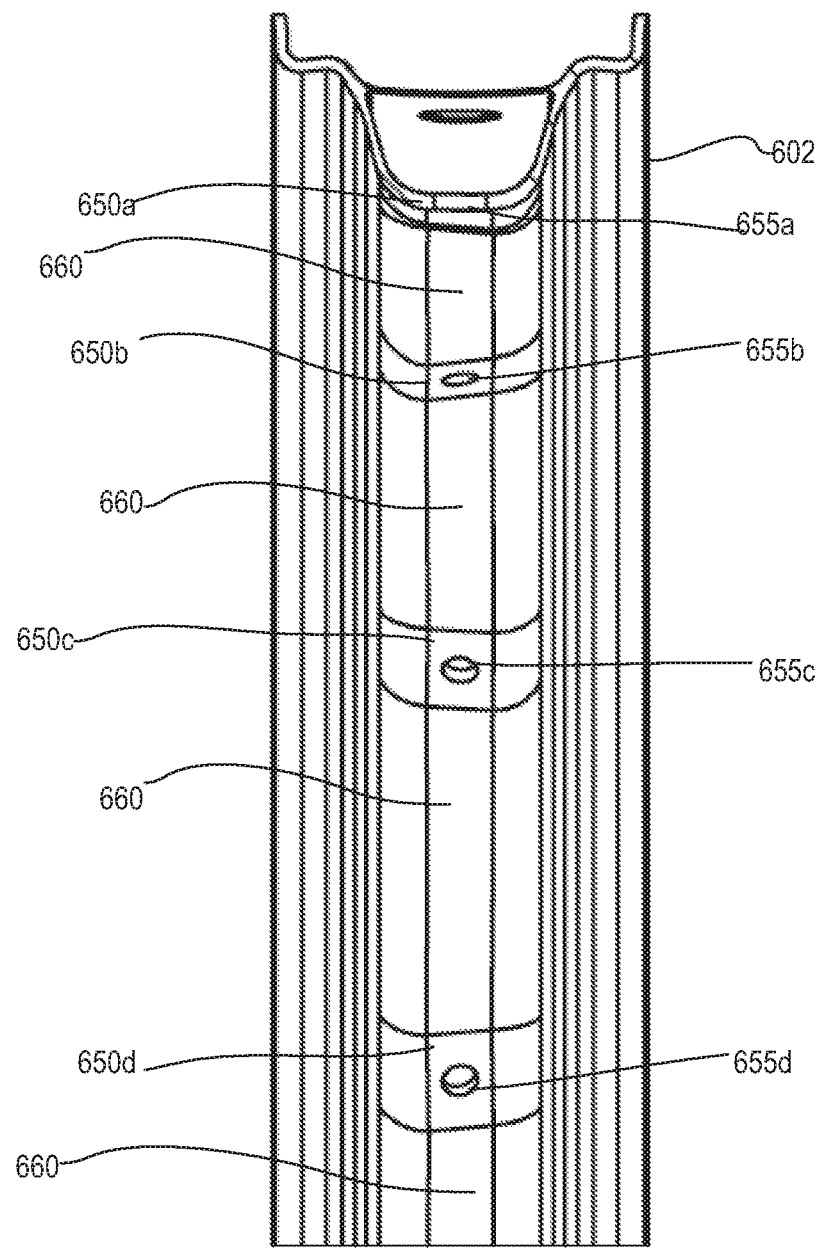
FIG. 18 illustrates a cross-sectional view of one embodiment of a rim adapted to seat tubeless tires.

Embodiments described herein may be implemented in rims suitable for tubeless tires and/or fat tires. FIG. 18 illustrates an embodiment of a bicycle wheel rim 602 in which the outer circumferential surface of rim 602 is adapted to seat a tubeless fat tire. While a double wall rim is illustrated, embodiments may also be implemented in single wall or other rims adapted to accommodate tubeless or fat tires. Bicycle rim 602 has a spoke bed comprising spoke attachment segments 650a, 650b, 650c, 650d and intermediate segments 660. Each spoke attachment segment 650a, 650b, 650c, 650d has a respective spoke opening 655a, 655b, 655c, 655d to receive a nipple. As discussed above, each spoke attachment segment 650a, 650b, 650c, 650d can be tilted so that the central axis of the respective spoke opening 655a, 655b, 655c, 655d aligns with a desired complex angle. In the illustrated embodiment, the spoke openings 655a, 655b, 655c, 655d are generally aligned with the centerline of rim 602. In other embodiments, the spoke openings may be offset from the centerline of rim 602. It will be appreciated that the embodiment of FIG. 18 is provided by way of example and not limitation and the number and angle of spoke attachment segments, offset of spoke openings and other aspects of a rim may vary based on the spoke pattern to be accommodated and other factors.

According to one embodiment, a rim (e.g., a rim 102, 242, 302, 402, 502, 602 or other rim according the teachings herein) may be molded from a composite material in a mold shaped to form spoke attachment segments at desired tilt angles and intermediate segments to transition between the spoke attachment segments. After the rim is released from the mold, the spoke openings may be bored or otherwise machined perpendicular to the radially outer surface or radially inner surface of the spoke bed.

Embodiments described herein provide rims adapted to provide better stress distribution and reduce spoke fatigue. As one advantage, embodiments can accommodate complex spoke angles without requiring additional bushings to support and angle the spoke nipples. In some cases, spokes may be connected to the rim using off-the-shelf spoke nipples.

As another advantage, the radially inner wall or bridge may be of a substantially uniform material thickness, enhancing moldability. As yet another advantage, the radially inner wall can remain relatively thin, saving weight.

One of ordinary skill in the art will appreciate that embodiments may be adapted for a variety of rim designs, spoke patterns and spoke angles.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A bicycle rim comprising:
   a circumferential outer portion adapted to receive a tire; and
   a spoke bed comprising a pattern of spoke attachment segments at varying tilt angles spaced by intermediate segments, each spoke attachment segment comprising:
   an inner surface of the spoke attachment segment;
   an outer surface of the spoke attachment segment; and
   a spoke opening extending from the inner surface to the outer surface and sized to accommodate a spoke nipple, the spoke opening having a central axis angled at a complex angle that is a combination of a respective camber angle and a respective crossing angle, the complex angle selected to achieve a respective spoke angle, wherein the outer surface of the spoke attachment segment adjacent to the spoke opening extends perpendicular to the central axis of the spoke opening.

2. The bicycle rim of claim 1, wherein, at each spoke attachment segment, the inner surface of the spoke attachment segment is parallel to the outer surface of the spoke attachment segment.

3. The bicycle rim of claim 1, wherein each spoke attachment segment is formed as a flat plate.

4. The bicycle rim of claim 1, wherein each intermediate segment has a twisted profile to transition between adjacent spoke attachment segments.

5. The bicycle rim of claim 1, wherein the intermediate segments are thinner than the spoke attachment segments.

6. The bicycle rim of claim 1, wherein the bicycle rim is formed of a composite material.

7. The bicycle rim of claim 1, wherein the pattern of spoke attachment segments comprises:
   a first spoke attachment segment having a first spoke opening with a first central axis at a first complex angle; and
   a second spoke attachment segment having a second spoke opening with a second central axis at a second complex angle, wherein the first complex angle and second complex angle are different angles.

8. The bicycle rim of claim 7, wherein the pattern of spoke attachment segments comprises:
   a third spoke attachment segment having a third spoke opening with a third central axis at a third complex angle; and
   a fourth spoke attachment segment having a fourth spoke opening with a fourth central axis at a fourth complex angle, the first complex angle, the second complex angle, the third complex angle and the fourth complex angle are different complex angles.

9. A bicycle wheel comprising:
   a hub;
   a bicycle rim, the bicycle rim comprising:
      a circumferential outer portion adapted to receive a tire;
      a spoke bed comprising a pattern of spoke attachment segments at varying tilt angles spaced by intermediate segments, each spoke attachment segment comprising:
      an inner surface of the spoke attachment segment;
      an outer surface of the spoke attachment segment;
      a spoke opening extending from the inner surface to the outer surface, the spoke opening having a central axis angled at a complex angle that is a combination of a camber angle and a crossing angle, wherein the outer surface of the spoke attachment segment adjacent to the spoke opening extends perpendicular to the central axis of the spoke opening;
   a plurality of spoke nipples, each of the plurality of spoke nipples disposed in a respective spoke opening of a respective spoke attachment segment from the pattern of the spoke attachment segments; and
   a plurality of spokes connected to the hub and connected to the bicycle rim by the plurality of spoke nipples, wherein each of the plurality of spokes is connected to a corresponding spoke nipple from the plurality of spoke nipples and extends at a spoke angle based on a respective complex angle of the respective spoke opening in which the corresponding spoke nipple is disposed.

10. The bicycle wheel of claim 9, wherein, at each spoke attachment segment, the inner surface of the spoke attachment segment is parallel to the outer surface of the spoke attachment segment.

11. The bicycle wheel of claim 9, wherein each spoke attachment segment is formed as a flat plate.

12. The bicycle wheel of claim 9, wherein each intermediate segment has a twisted profile to transition between adjacent spoke attachment segments.

13. The bicycle wheel of claim 9, wherein the intermediate segments are thinner than the spoke attachment segments.

14. The bicycle wheel of claim 9, wherein the bicycle rim is formed of a composite material.

15. The bicycle wheel of claim 9, wherein the pattern of spoke attachment segments comprises:
   a first spoke attachment segment having a first spoke opening with a first central axis at a first complex angle; and
   a second spoke attachment segment having a second spoke opening with a second central axis at a second complex angle, wherein the first complex angle and second complex angle are different angles.

16. The bicycle wheel of claim 15, wherein the pattern of spoke attachment segments comprises:
   a third spoke attachment segment having a third spoke opening with a third central axis at a third complex angle; and
   a fourth spoke attachment segment having a fourth spoke opening with a fourth central axis at a fourth complex angle, the first complex angle, the second complex angle, the third complex angle and the fourth complex angle are different complex angles.

* * * * *